US010752096B2

(12) United States Patent
Sannohe

(10) Patent No.: US 10,752,096 B2
(45) Date of Patent: Aug. 25, 2020

(54) SLIDING DOOR FOR VEHICLE

(71) Applicant: HONDA MOTOR CO., LTD., Minato-ku, Tokyo (JP)

(72) Inventor: Sho Sannohe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 133 days.

(21) Appl. No.: 16/225,142

(22) Filed: Dec. 19, 2018

(65) Prior Publication Data
US 2019/0225060 A1 Jul. 25, 2019

(30) Foreign Application Priority Data
Jan. 25, 2018 (JP) .................................. 2018-010893

(51) Int. Cl.
*B60J 5/06* (2006.01)
*B60J 10/74* (2016.01)
*B60J 5/04* (2006.01)

(52) U.S. Cl.
CPC ................ *B60J 5/06* (2013.01); *B60J 10/74* (2016.02); *B60J 5/043* (2013.01); *B60J 5/0413* (2013.01)

(58) Field of Classification Search
CPC .... B01D 35/147; B01D 35/15; B61D 45/007; G06F 11/3409; G06F 11/3433; B29C 49/06; B29K 2067/00; B29K 2995/004; B29K 2995/0041; B29K 2002/7468
See application file for complete search history.

(56) References Cited

U.S. PATENT DOCUMENTS

| | | | | | |
|---|---|---|---|---|---|
| 4,544,198 | A | * | 10/1985 | Ochiai | B60J 5/0479 296/155 |
| 4,585,257 | A | * | 4/1986 | Chikaraishi | E05B 77/265 29/21 |
| 4,648,208 | A | * | 3/1987 | Baldamus | B60J 5/0416 49/502 |
| 6,152,519 | A | * | 11/2000 | Blank | E05F 15/646 296/155 |

(Continued)

FOREIGN PATENT DOCUMENTS

| | | |
|---|---|---|
| JP | 2006188089 A | 7/2006 |
| JP | 2007145118 A | 6/2007 |

(Continued)

OTHER PUBLICATIONS

Notice of Reasons for Refusal for JP Application No. 2018-010893, dated Jul. 2, 2019, 5 pages.

*Primary Examiner* — Kiran B Patel
(74) *Attorney, Agent, or Firm* — Armstrong Teasdale LLP

(57) ABSTRACT

A sliding door (12) for a vehicle (1) comprises an outer panel (21) defining an outer side surface of the vehicle, and an inner panel (22) joined to the outer panel along an outer periphery thereof, and having a central part spaced from the outer panel (21) on an inboard side of the outer panel. The inner panel includes a first inner wall portion (41, 51) extending forward from a rear edge of the inner panel and having a major plane facing laterally, and a second inner wall portion (42, 52) extending in an inboard direction from a front end of the first inner wall portion and having a major plane facing in a fore and aft direction, and a light emitter (81) or a reflector (91) is affixed to a rear surface of the second inner wall portion so as to irradiate light rearward.

9 Claims, 4 Drawing Sheets

(56) References Cited

U.S. PATENT DOCUMENTS

| | | | |
|---|---|---|---|
| 6,848,217 B2* | 2/2005 | Hashimoto | B60J 10/24 49/490.1 |
| 7,055,885 B2* | 6/2006 | Ishihara | E05F 15/44 200/61.43 |
| 7,390,049 B2* | 6/2008 | Nishikawa | B60J 5/0402 296/146.1 |
| 7,703,837 B2* | 4/2010 | Lichter | B60J 5/06 296/146.1 |
| 7,954,880 B2* | 6/2011 | Kunishima | B60J 5/06 292/241 |
| 8,007,028 B2* | 8/2011 | Pencak | B60J 5/06 296/155 |
| 8,511,740 B2* | 8/2013 | Anderson | B60J 5/06 296/146.6 |
| 8,752,332 B2* | 6/2014 | Thiele | B60J 5/06 49/27 |
| 10,166,847 B2* | 1/2019 | Sugie | B60J 5/0429 |
| 10,322,625 B2* | 6/2019 | Sakakibara | B60J 5/0479 |
| 10,525,800 B2* | 1/2020 | Kanasugi | B60J 5/0415 |
| 10,562,382 B2* | 2/2020 | Kobatake | B60J 5/06 |
| 10,590,681 B2* | 3/2020 | Jeong | E05B 77/26 |
| 2008/0092453 A1* | 4/2008 | Fuetterer | B60J 5/0416 49/502 |
| 2009/0051517 A1 | 2/2009 | Suzuki | |
| 2009/0184501 A1* | 7/2009 | Hirotani | B60J 5/0451 280/730.2 |

FOREIGN PATENT DOCUMENTS

| | | |
|---|---|---|
| JP | 2009029156 A | 2/2009 |
| JP | 2009143519 A | 7/2009 |
| JP | 2009173078 A | 8/2009 |

* cited by examiner

SLIDING DOOR FOR VEHICLE

TECHNICAL FIELD

The present invention relates to a sliding door for vehicles.

BACKGROUND ART

The sliding door for a motor vehicle is typically configured to selectively open an entrance defined between a B pillar and a C pillar of the vehicle body (see JP2006-188089A, for example). The sliding door is provided with an outer panel defining the outer side surface of the vehicle, and an inner panel provided on the inboard side of the outer panel and joined to the outer panel along an outer periphery thereof while a central part of the inner panel is spaced away from the outer panel to define a space between the two panels. Thus, the sliding door has a certain thickness in the transverse direction of the vehicle.

The vehicle sliding door provides an advantage of requiring a relatively small space on the side of the vehicle to allow a passenger to get into and out of the vehicle, but the projecting length of the sliding door when the sliding door is opened is so small that it may present some difficulty for a person approaching the vehicle from the rear to recognize the open state of the sliding door. To alleviate this problem, it has been proposed and/or practiced to attach a lamp or a reflecting plate on a read end of the sliding door. However, the rear end of the sliding door is typically slanted in a forward direction. Therefore, when a lamp is attached to the rear end of the sliding door, the light radiated from the lamp is directed in an oblique direction so that the person approaching the vehicle from the rear may fail to recognize the open state of the sliding door. The same is true with a reflecting plate.

SUMMARY OF THE INVENTION

In view of such a problem of the prior art, a primary object of the present invention is to provide a sliding door for a vehicle that allows an open state of the sliding door to be readily recognized by a person approaching the vehicle from the rear.

The present invention achieves such an object by providing a sliding door (12) for a vehicle (1), comprising: an outer panel (21) defining an outer side surface of the vehicle; and an inner panel (22) provided on an inboard side of the outer panel and joined to the outer panel along an outer periphery thereof, the inner panel having a central part spaced away from the outer panel (21) to define a space between the inner panel and the outer panel; wherein the inner panel includes a first inner wall portion (41, 51) extending forward from a rear edge of the inner panel and having a major plane facing laterally, and a second inner wall portion (42, 52) extending in an inboard direction from a front end of the first inner wall portion and having a major plane facing in a fore and aft direction, and a light emitter (81) or a reflector (91) is affixed to a rear surface of the second inner wall portion so as to irradiate light rearward.

Since the light emitter or the reflector (91) is affixed to the rear surface of the second inner wall portion defining a rear end of the sliding door, light can be irradiated or reflected rearward so that an occupant of a vehicle approaching from the rear or a pedestrian located to the rear of the vehicle is enabled to recognize the open state of the sliding door in a reliable manner. In other words, a pedestrian or the like can readily recognize the open state of the sliding door from the rear.

Preferably, the outer panel includes an outer wall portion (36, 47) having a major plane facing laterally and overlapping with the first inner wall portion, and the first inner wall portion and the outer wall portion are fastened to each other by a fastening member (71, 72) passed through the first inner wall portion and the outer wall portion.

Thereby, the inner panel and the outer panel can be joined to each other at the first inner wall portion and the outer wall portion which are parallel to each other by using the fastening member. The fastening member may be configured to detachably join the first inner wall portion and the outer wall portion to each other.

Preferably, the inner panel and the outer panel define a window opening (29), and the first inner wall portion, the second inner wall portion, and the outer wall portion form a part of a rear sash (27) that defines a rear end of the window opening.

Thereby, the light emitter or the reflector can be positioned at a relatively high position from the ground surface so that the visibility of the light emitter or the reflector can be improved for a person approaching the vehicle from the rear.

Preferably, a holder (62) for supporting a window panel (61) is secured to the outer wall portion by the fastening member, and a part of the window panel is positioned on an outboard side of the first inner wall portion.

Thereby, the holder can be fastened to the outer panel by using the fastening member that is used for joining the inner panel and the outer panel to each other so that the number of component parts can be minimized.

Preferably, the holder includes a hook portion (65) engaging an edge of the window panel and a first seal member (67) provided on the hook portion so as to abut against an outer surface of the window panel and an outer surface of the outer wall portion.

Thereby, a gap between the edge of the window panel and the outer panel can be sealed by favorably utilizing the hook portion.

According to a preferred embodiment of the present invention, the inner panel includes a third inner wall portion (53) extending forward from an inboard end of the second inner wall portion and having a major plane facing laterally, a fourth inner wall portion (54) extending from a front end of the third inner wall portion in an outboard direction, and a fifth inner wall portion (55) extending forward from an outboard end of the fourth inner wall portion and having a major plane facing laterally, wherein the fifth inner wall portion has a front edge joined to a front edge of the outer wall portion so as to jointly define a rear edge of the window opening, and the front edges of the fifth inner wall portion and the outer wall portion are fitted with a second seal member (74) that abuts the window panel.

Thereby, the gap between the front edge of the rear sash and the window panel can be favorably sealed by the second seal member. As a result, the gap between the front edge of the rear sash and the window panel can be sealed doubly by the first and second seal members.

Preferably, a reinforcing member is provided between the inner panel and the outer panel, and includes a part joined to the first inner wall portion and the outer wall portion by the fastening member.

Thereby, the fastening member can be utilized additionally for joining the reinforcing member to the inner panel and the outer panel.

Preferably, an outboard edge of the light emitter or the reflector is located more inboard than an inboard edge of the fastening member.

Thereby, the light emitted or reflected from the light emitter or the reflector can be directed rearward without being hindered by the fastening member.

Preferably, the light emitter or the reflector is formed as a plate that extends along a rear surface of the second inner wall portion.

Thereby, the gap between the C pillar and the second inner wall portion can be minimized without interfering with the light emitter or the reflector.

Thus, according to the present invention, in the sliding door of the vehicle, the open state of the sliding door can be readily recognized from the rear of the vehicle.

BRIEF DESCRIPTION OF THE DRAWING(S)

DETAILED DESCRIPTION OF THE INVENTION

Figure 1:
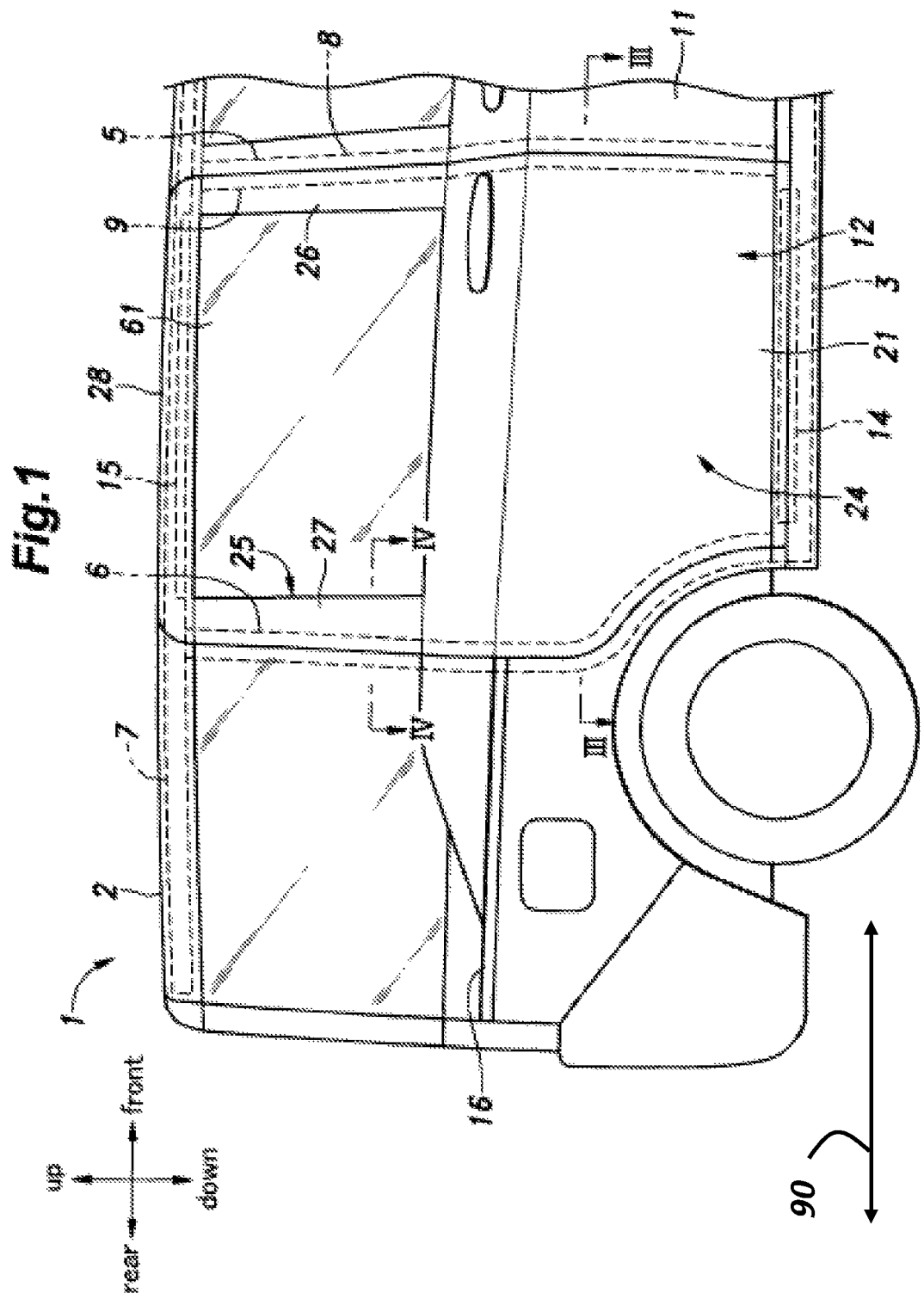
FIG. 1 is a right side view of a rear part of a vehicle according to an embodiment of the present invention.

A sliding door of a vehicle according to an embodiment of the present invention is described in the following with reference to the appended drawings.

The vehicle body 2 of the vehicle 1 includes, on each side thereof, a side sill 3 extending in a fore and aft direction 80 along a lower side part of the vehicle body 2, a plurality of pillars including an A pillar (not shown), a B pillar 5 and a C pillar 6 extending upwardly from the side sill 3, and a roof side frame 7 along an upper side part of the vehicle body 2 and connected to the upper ends of the A pillar, the B pillar 5 and the C pillar 6.

The opening defined by the side sill 3, the A pillar, the B pillar 5 and the roof side frame 7 forms a front entrance opening 8, and the opening defined by the side sill 3, the B pillar 5, the C pillar 6 and the roof side frame 7 forms a rear entrance opening 9. The front entrance opening 8 is fitted with a swing door 11 hinged to the A pillar.

The rear entrance opening 9 is fitted with a sliding door 12. A lower rail 14 is provided on the side sill 3, an upper rail 15 is provided on the roof side frame 7, and a rear rail 16 is provided on a side panel of the vehicle body 2 behind the rear entrance opening 9. Each rail 14, 15 and 16 extends in the fore and aft direction 90, and has a front end which is curved in an inboard direction 88 (see FIG. 3) that extends laterally inwardly from an exterior side of the vehicle 1 towards a longitudinal centerline (not shown) of the vehicle 1. The sliding door 12 is provided with three arms which are slidably supported by the lower rail 14, the upper rail 15, and the rear rail 16, respectively. Thus, the sliding door 12 is provided on the rear entrance opening 9 so as to be movable between a closed position for closing the rear entrance opening 9 and an open position for opening the rear entrance opening 9 by moving rearward and outward from the closed position.

The sliding door 12 includes an outer panel 21 defining the outer surface of the vehicle 1, and an inner panel 22 provided on the inboard side of the outer panel 21 (i.e., inboard of the outer panel 21 in the inboard direction 88) and joined to the outer panel 21 along an outer peripheral part thereof. The outer panel 21 and the inner panel 22, including a central part 92 (see FIG. 3) thereof, are otherwise spaced apart from each other so as to define a space 93 (see FIG. 3) between the outer panel 21 and the inner panel 22. Specifically, the inner panel 22 has a central part 92 protruding (bulging out) in the inboard direction 88 to define the space 93 between the outer panel 21 and the inner panel 22. The peripheral edge part of the outer panel 21 is joined to the corresponding edge part of the inner panel 22 by hemming along the entire periphery of the inner panel 22.

The sliding door 12 includes a door main body 24 forming a lower part of the sliding door 12, and a sash portion 25 (a window frame portion) positioned above the door main body 24 and forming an upper part of the sliding door 12. The sash portion 25 includes a front sash 26 and a rear sash 27 extending upward from the front end and the rear end of the upper edge of the door main body 24, respectively, and an upper sash 28 extending in the fore and aft direction 90 between the upper end of the front sash 26 and the upper end of the rear sash 27. The front sash 26, the rear sash 27, the upper sash 28, and the upper edge of the door main body 24 jointly form a rectangular frame, and define a window opening 29 therein. The rear sash 27 defines a rear end 89 of the window opening 29. The door main body 24 and the sash portion 25 are formed jointly by the outer panel 21 and the inner panel 22.

Figure 2:
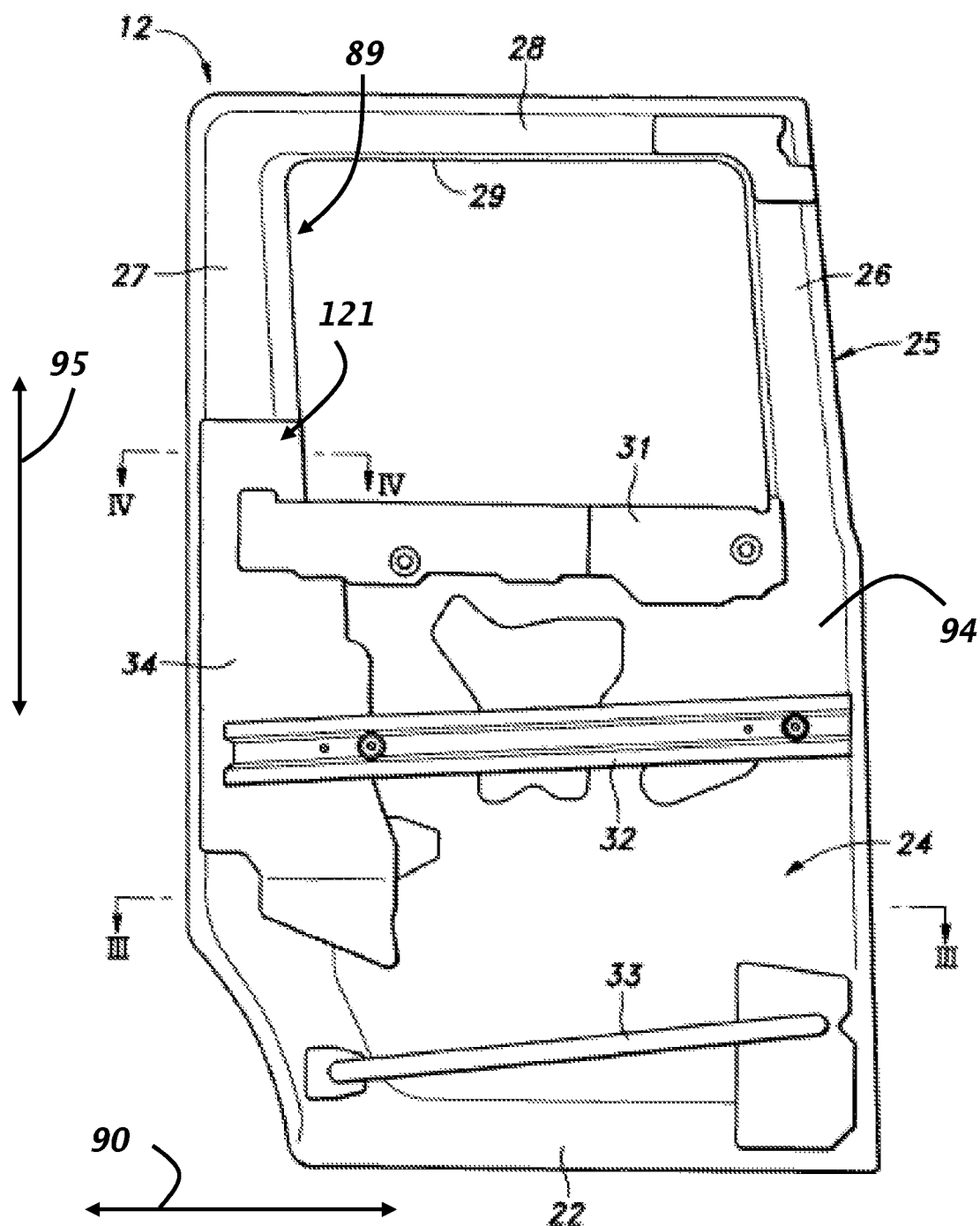
FIG. 2 is a side view of an inner panel of a sliding door as viewed from outside of the vehicle.

As shown in FIG. 2, an upper reinforcing member 31, a central reinforcing member 32, a lower reinforcing member 33, and a rear reinforcing member 34 are attached to an outboard side 94 of the inner panel 22 of the door main body 24. The upper reinforcing member 31, the central reinforcing member 32, and the lower reinforcing member 33 are spaced apart from each other in a vertical direction 95, and extend in the fore and aft direction 90. The rear reinforcing member 34 extends vertically along the rear edge of the door main body 24. The upper end of the rear reinforcing member 34 extends into a part of the inner panel 22 forming the rear sash 27, and overlaps with the rear sash 27. The rear ends of the upper reinforcing member 31 and the central reinforcing member 32 are joined to the rear reinforcing member 34. Each of the reinforcing members 31 to 34 may consist of a sheet metal member or a pipe member, and is welded to the inner panel 22.

Figure 3:
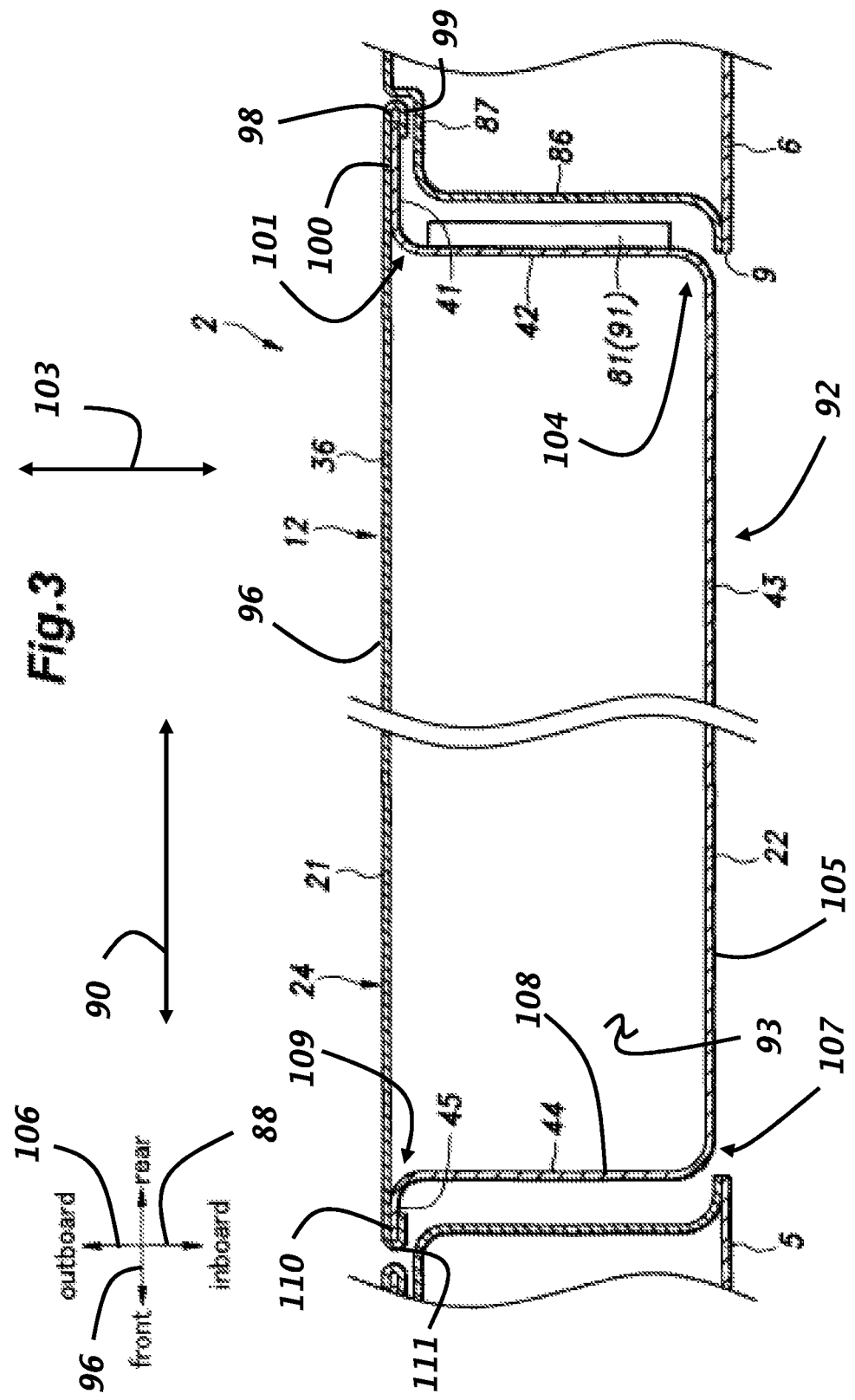
FIG. 3 is a sectional view taken along line III-III of FIG. 1.

As shown in FIG. 3, the part of the outer panel 21 forming the door main body 24 includes a main body outer wall portion 36 having a major plane facing laterally, or defining a planar face 96 that extends in the fore and aft direction 90. The part of the inner panel 22 forming the door main body 24 includes a first main body inner wall portion 41 extending in a forward direction 97 from a rear edge 98 of the inner panel 22, where the rear edge 98 is joined to a rear edge 99 of the main body outer wall portion 36, and having a major plane facing laterally, or defining a planar face 100 that extends in the fore and aft direction 90. The part of the inner panel 22 forming the door main body also includes a second main body inner wall portion 42 extending in the inboard direction 88 from a front edge 101 of the first main body inner wall portion 41 and having a major plane facing in the fore and aft direction 90, or defining a planar face 102 that extends in a lateral (or inboard-outboard) direction 103, a third main body inner wall portion 43 extending in the forward direction 97 from an inboard end 104 of the second main body inner wall portion 42 and having a major plane facing laterally, or defining a planar face 105 that extends in the fore and aft direction 90, a fourth main body inner wall portion 44 extending in an outboard direction 106 (opposite the inboard direction 88) from a front end 107 of the third main body inner wall portion 43 and having a major plane facing in the fore and aft direction 90, or defining a planar face 108 that extends in the lateral direction 103, and a fifth main body inner wall portion 45 extending forward from an outboard end 109 of the fourth main body inner wall portion 44. A front edge 110 of the fifth main body inner wall portion 45 is joined to a front edge 111 of the main body outer wall portion 36. The lower edge of the third main body inner wall portion 43 is joined to the lower edge of the main body outer wall portion 36.

The third main body inner wall portion 43 laterally opposes (e.g., extends parallel to) the main body outer wall portion 36 with the space 93 defined therebetween. The second main body inner wall portion 42 is substantially orthogonal to the fifth main body inner wall portion 45 and the third main body inner wall portion 43, and extends vertically (e.g., in the vertical direction 95, shown in FIG. 2).

Figure 4:
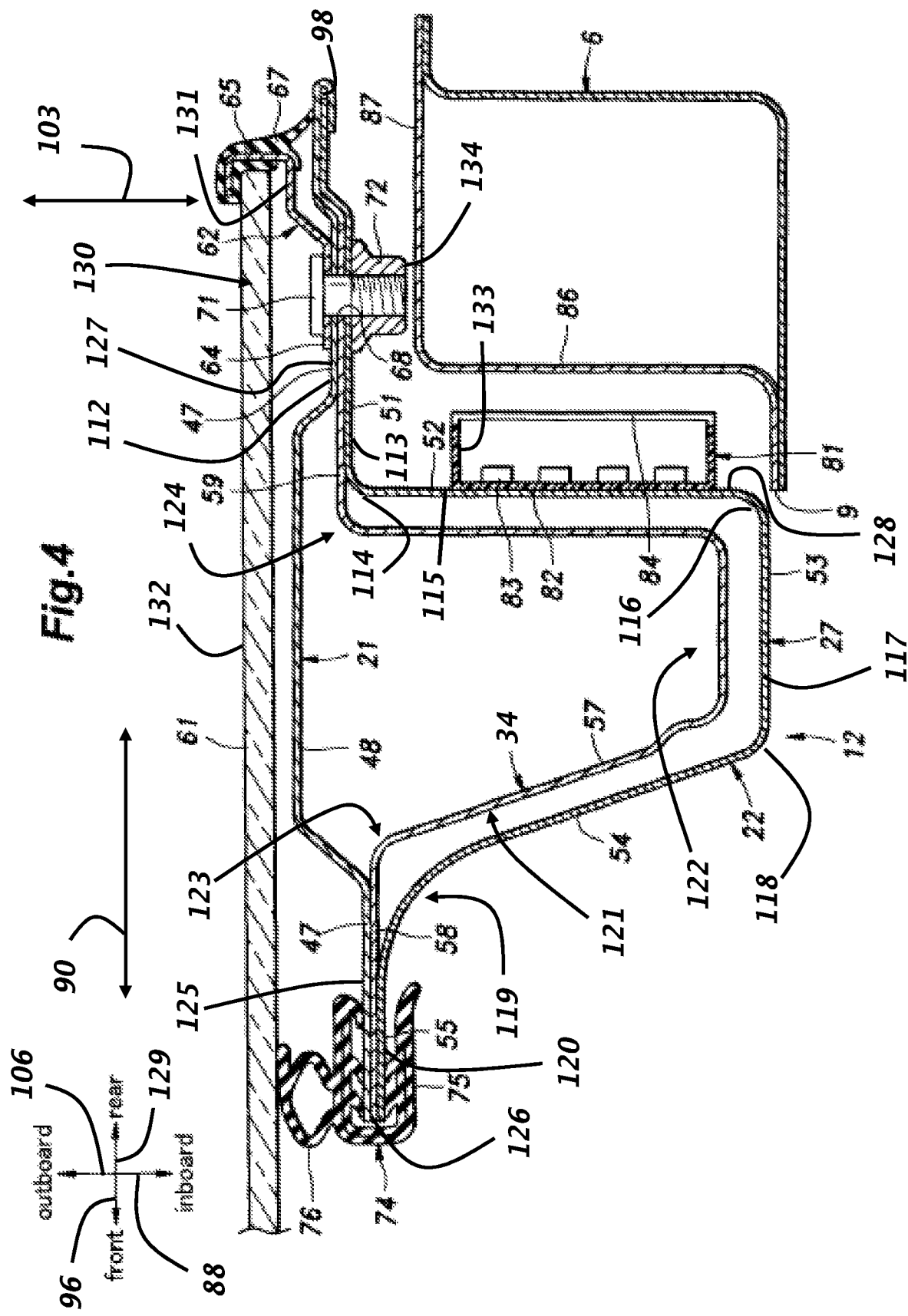
FIG. 4 is a sectional view taken along line IV-IV of FIG. 1.

As shown in FIG. 4, a part of the outer panel 21 forming the rear sash 27 includes a rear sash outer wall portion 47 which is substantially planar and has a major plate facing laterally, or defines a planar face 112 that extends in the fore and aft direction 90. The rear sash outer wall portion 47 extends vertically (e.g., in the vertical direction 95, shown in FIG. 2) and has a lower end which is continuous with the upper rear end part of the main body outer wall portion 36. The rear sash outer wall portion 47 is provided with a protruding portion 48 protruding in the outboard direction 106 and having a protruding end defining a planar plane facing in the lateral direction.

The inner panel 22 includes a first rear sash inner wall portion 51 extending forward from a rear edge of the inner panel 22 and having a major plane facing laterally, or defining a planar face 113 extending in the fore and aft direction 90, a second rear sash inner wall portion 52 extending from a front end 114 of the first rear sash inner wall portion 51 in the inboard direction 88 and having a major plane facing in the fore and aft direction 90, or defining a planar face 115 extending in the lateral direction 103, a third rear sash inner wall portion 53 extending forward (e.g., in the forward direction 96) from an inboard end 116 of the second rear sash inner wall portion 52 and having a major plane facing laterally, or defining a planar face 117 extending in the fore and aft direction 90, a fourth rear sash inner wall portion 54 extending from a front end 118 of the third rear sash inner wall portion 53 in the outboard direction 106, and a fifth rear sash inner wall portion 55 extending forward from an outboard end 119 of the fourth rear sash inner wall portion 54 and having a major plane facing laterally, or defining a planar face 120 extending in the fore and aft direction 90. The second rear sash inner wall portion 52 is substantially orthogonal to the first rear sash inner wall portion 51 and the third rear sash inner wall portion 53, and extends vertically (e.g., in the vertical direction 95).

In a lower part of the rear sash 27, an upper part 121 of the rear reinforcing member 34 is positioned between the inner panel 22 and the outer panel 21. The upper part 121 of the rear reinforcing member 34 is formed by a plate member. More specifically, the upper part 121 of the rear reinforcing member 34 includes a channel portion 57 extending vertically (e.g., in the vertical direction 95) and having a substantially rectangular cross section with an open side 122 facing in the outboard direction 106, and a front flange 58 and a rear flange 59 extending in the fore and aft direction 90 along the front and rear edges 123, 124 of the channel portion 57, respectively, and each having a major plane facing laterally.

A front part 125 of the rear sash outer wall portion 47, the front flange 58, and the fifth rear sash inner wall portion 55 are placed one over the other in that order from the outboard side, and are welded to one another. The front edges of the rear sash outer wall portion 47, the front flange 58, and the fifth rear sash inner wall portion 55 are flush with one another to jointly define a rear edge 126 of the window opening 29.

A rear part 127 of the rear sash outer wall portion 47, the rear flange 59, and the first rear sash inner wall portion 51 are placed one over another in that order from the outboard side, and welded to one another. The rear edge of the first rear sash inner wall portion 51 extends beyond the rear edge of the rear flange 59, and the rear sash outer wall portion 47 extends beyond the rear edge of the first rear sash inner wall portion 51, and is wrapped around the rear edge of the first rear sash inner wall portion 51 so that the rear edges of the rear sash outer wall portion 47 and the first rear sash inner wall portion 51 are joined together by hemming. The channel portion 57 of the rear reinforcing member 34 is convex toward the inboard side, and is surrounded by the second rear sash inner wall portion 52, the third rear sash inner wall portion 53, and the fourth rear sash inner wall portion 54 mostly in a spaced apart relationship.

A rear holder 62 for retaining a window panel 61 is attached to the outer surface 131 of a rear part of the rear sash outer wall portion 47. The window panel 61 is a transparent member made of glass or resin, and is disposed on the outboard side of the window opening 29 so as to close the window opening 29. The rear holder 62 includes a base portion 64 that abuts against and fixedly attached to the outer surface 131 of the rear sash outer wall portion 47, a hook portion 65 that protrudes rearward from the base portion 64 and is hooked forward at the free end thereof, and a first seal member 67 fitted on the hook portion 65. The base portion 64 and the hook portion 65 extend vertically (e.g., in vertical direction 95) along the rear sash outer wall portion 47.

The base portion 64 and the hook portion 65 are formed by bending a metal plate, for example. The first seal member 67 may be made of material which is resiliently deformable such as rubber or elastomer, for example. The first seal member 67 may be attached to the hook portion 65, for example, by insert molding.

A through hole 68 is passed through the base portion 64 of the rear holder 62, a rear part of the rear sash outer wall portion 47, the rear reinforcing member 34, and the first rear sash inner wall portion 51 in the thickness-wise direction (e.g., the lateral direction 103). A fastening member is passed into the through hole 68 for jointly fastening the base portion 64, the rear part of the rear sash outer wall portion 47, the rear reinforcing member 34, and the first rear sash inner wall portion 51. The fastening member may consist of a bolt and a nut, a rivet, a clip or the like. In the present embodiment, the fastening member consists of a bolt 71 and a nut 72. The bolt 71 is inserted into the through hole 68 from the outside of the vehicle, and the nut 72 is threaded onto the tip of the bolt 71 from the inside of the vehicle. A number of such through holes 68 and the associate fasteners may be arranged along the rear end 89 of the window opening 29.

The hook portion 65 of the rear holder 62 defines a channel shaped retaining portion opening forward (e.g., in the forward direction 96) to surround and retain a rear edge 130 of the window panel 61. The first seal member 67 is interposed between the hook portion 65 and an outer surface 132 of the window panel 61 so as to seal a gap between the hook portion 65 and the window panel 61. The first seal member 67 also extends from the rear end of the hook portion 65 in the inboard direction 88, and abuts against the rear sash outer wall portion 47 to seal a gap between the rear holder 62 and the rear sash outer wall portion 47.

The rear end part of the window panel 61 is positioned on the outboard side of the rear sash 27. More specifically, the rear edge 130 of the window panel 61 is positioned so as to overlap with the first rear sash inner wall portion 51 when viewed from sideways. Although not shown in the drawings, the window panel 61 is fixed to the remaining part of the inner periphery of the window opening 29 of the outer panel 21 by using hooks, fasteners, adhesives or the like in a per se known manner.

A second seal member 74 is fitted on the front edges of the rear sash outer wall portion 47 and the fifth rear sash inner wall portion 55. The second seal member 74 is provided with a groove portion 75 for receiving the front edges of the rear sash outer wall portion 47 and the fifth rear sash inner wall portion 55 and a hollow projecting portion 76 projecting in the outboard direction 106 from the outboard side of the groove portion 75. The second seal member 74 is a made of material which is resiliently deformable such as rubber and elastomer. The projecting portion 76 of the second seal member 74 abuts against the inboard surface of the window panel 61 to seal the gap between the rear sash outer wall portion 47 and the window panel 61.

A light emitter or a reflector is provided on a rear surface 128 of the second rear sash inner wall portion 52. In the present embodiment, a lamp unit 81 is provided. The lamp unit 81 includes a flat box-shaped housing 82 having an open rear end, a light emitting device 83 such as an LED and an electric bulb provided inside the housing 82, and a transparent cover 84 that closes the open rear end of the housing 82. The housing 82 is provided with a flat plate shape having a major plane facing in the fore and aft direction 90. In particular, the housing 82 has a small thickness in the fore and aft direction 90, and extends along the rear surface of the second rear sash inner wall portion 52. Therefore, the lamp unit 81 can be accommodated in the small gap defined between the C pillar 6 and the second rear sash inner wall portion 52. To minimize the gap between the C pillar 6 and the second rear sash inner wall portion 52 in order to ensure an air tight closure of the sliding door, the lamp unit 81 is desired to be as thin as possible. If desired, the second rear sash inner wall portion 52 may be locally recessed forward so that the lamp unit 81 may be placed at least partly in such a recess so that the protrusion of the lamp unit 81 from the general profile of the second rear sash inner wall portion 52 may be minimized or even eliminated.

The cover 84 of the lamp unit 81 faces rearward (e.g., in a rearward direction 129) so that the light may be irradiated toward the rear. It is preferable that the lamp unit 81 has a large width in the lateral direction 103 and/or a large length in the vertical direction 95 on the rear surface of the second rear sash inner wall portion 52. In the illustrated embodiment, an outboard edge 133 of the lamp unit 81 is offset in the inboard direction 88 relative to and inboard end 134 of the fastening member (the bolt 71 and the nut 72). Thereby, the light irradiated from the lamp unit 81 can travel rearward without being blocked or hindered by the fastening member.

The lamp unit 81 is controlled to be turned on and off by a control device (not shown in the drawings). The control device detects the position of the sliding door 12, for example, by a position sensor to turn off the lamp unit 81 when the sliding door 12 is closed, and to turn on the lamp unit 81 when the sliding door 12 is in a position other than the closed position (is open or in a motion in a closing or opening direction). As a result, when the sliding door 12 is open, the lamp unit 81 lights up so that a pedestrian located behind the vehicle 1 or an occupant of another vehicle approaching the vehicle from the rear can readily recognize that the sliding door 12 is open.

As shown in FIG. 3, the lamp unit 81 may also be provided on the rear surface of the second main body inner wall portion 42. The lamp unit 81 may be provided on at least one of the second rear sash inner wall portion 52 and the second main body inner wall portion 42.

In an alternate embodiment, the lamp unit 81 is replaced by a reflecting plate 91 that reflects light (see FIG. 3). Like the lamp unit 81, the reflecting plate 91 is formed in a flat plate shape having a major plane facing in the fore and aft direction 90. It is preferable that the thickness of the reflecting plate 91 is as small as possible.

As shown in FIG. 4, the C pillar 6 forming the rear edge of the rear entrance opening 9 has a front face 86 extending in a plane facing the fore and aft direction 90 and an outboard face 87 extending in a plane orthogonal to the front face 86 (or facing laterally). When the sliding door 12 is in the closed position, the second rear sash inner wall portion 52 and the second main body inner wall portion 42 oppose the front face 86 of the C pillar 6 in the fore and aft direction 90 with a gap defined therebetween. In addition, the first rear sash inner wall portion 51 and the first main body inner wall portion 41 oppose the outboard face 87 of the C pillar 6 in the lateral direction 103 with a gap defined therebetween. At this time, a gap is created between the rear surface of the lamp unit 81 and the front face 86 of the C pillar 6.

The effect of the sliding door 12 configured as described above is described in the following. When the sliding door 12 is in the open state, the sliding door 12 is positioned on the vehicle outboard side with respect to the C pillar 6 so that the second rear sash inner wall portion 52 defining the rear end surface of the sliding door 12 becomes visible from the rear of the vehicle. Since the lamp unit 81 is provided on the second rear sash inner wall portion 52, when the sliding door 12 is open, light is irradiated toward the rear of the vehicle 1. Thus, the occupant of another vehicle approaching the vehicle from the rear or a pedestrian walking behind the vehicle 1 can readily recognize that that the sliding door 12 is open. Thus, any person located behind the vehicle can easily recognize the open state of the sliding door 12. Since the rear surface of the second rear sash inner wall portion 52 extends along a plane facing in the fore and aft direction 90, the lamp unit 81 can direct the light rearward. As a result, a pedestrian or an occupant of a vehicle approaching the vehicle from the rear can easily recognize the lamp unit 81.

Since the lamp unit 81 is provided on the rear sash 27 which is located at a relatively high position from the ground, the height of the lamp unit 81 can be brought close to the height of the eye point of the pedestrian or the occupant of another vehicle. As a result, the lamp unit 81 has a high visibility for a person approaching the vehicle from the rear or standing behind the vehicle.

Since the first rear sash inner wall portion 51 and the rear part of the rear sash outer wall portion 47 extend along a plane that faces in the lateral direction 103, and are layered one over the other, the first rear sash inner wall portion 51 and the rear part of the rear sash outer wall portion 47 can be fastened together by using the fastening member such as the bolt 71 and the nut 72 of the illustrated embodiment. Since the fastening member (the bolt 71 and the nut 72) also serve as the fastening member for fastening the rear holder 62 and the rear reinforcing member 34 to the rear sash outer wall portion 47, the number of necessary component parts can be reduced.

Since the gap between the window panel 61 and the rear sash outer wall portion 47 is doubly sealed from the outside by the first seal member 67 and the second seal member 74, air and moisture can effectively prevented from getting into the passenger compartment of the vehicle.

Although the present invention has been described in terms of a specific embodiment, but various parts of the present invention can be substituted and omitted in a number of different ways without departing from the spirit of the present invention. In the above described embodiment, the window panel 61 was fixedly attached to the outer panel 21 by the rear holder 62. However, the window panel 61 may also be arranged so as to be slidable in the vertical direction, or hinged at the front end or the rear end of the window panel 61 so as to be pivotable around the hinge axis of such a hinge.

The invention claimed is:

1. A sliding door for a vehicle, comprising:
an outer panel defining an outer side surface of the vehicle; and
an inner panel provided on an inboard side of the outer panel and joined to the outer panel along an outer periphery thereof, the inner panel having a central part spaced away from the outer panel to define a space between the inner panel and the outer panel;
wherein the inner panel includes a first inner wall portion extending forward from a rear edge of the inner panel and defining a planar face extending in a fore and aft direction, and a second inner wall portion extending in an inboard direction from a front end of the first inner wall portion and defining a planar face extending in a lateral direction, and
a light emitter or a reflector is affixed to a rear surface of the second inner wall portion so as to irradiate light in a rearward direction.

2. The sliding door according to claim 1, wherein the outer panel includes an outer wall portion defining a planar face that extends in the fore and aft direction and overlapping with the first inner wall portion, and the first inner wall portion and the outer wall portion are fastened to each other by a fastening member passed through the first inner wall portion and the outer wall portion.

3. The sliding door according to claim 2, wherein the inner panel and the outer panel define a window opening, and the first inner wall portion, the second inner wall portion, and the outer wall portion form a part of a rear sash that defines a rear edge of the window opening.

4. The sliding door according to claim 3, wherein a holder for supporting a window panel is secured to the outer wall portion by the fastening member, and a rear edge of the window panel overlaps with the first inner wall portion.

5. The sliding door according to claim 4, wherein the holder includes a hook portion engaging an edge of the window panel and a first seal member provided on the hook portion so as to abut against an outer surface of the window panel and an outer surface of the outer wall portion.

6. The sliding door according to claim 4, wherein the inner panel includes
a third inner wall portion extending forward from an inboard end of the second inner wall portion and defining a planar face extending in the fore and aft direction,
a fourth inner wall portion extending from a front end of the third inner wall portion in an outboard direction, and
a fifth inner wall portion extending forward from an outboard end of the fourth inner wall portion and defining a planar face that extends in the fore and aft direction,
wherein the fifth inner wall portion has a front edge joined to a front edge of the outer wall portion so as to jointly define a rear edge of the window opening, and
the front edges of the fifth inner wall portion and the outer wall portion are fitted with a second seal member that abuts the window panel.

7. The sliding door according to claim 2, wherein a reinforcing member is provided between the inner panel and the outer panel, and includes an upper part joined to the first inner wall portion and the outer wall portion by the fastening member.

8. The sliding door according to claim 1, wherein an outboard edge of the light emitter or the reflector is located more inboard than an inboard end of the fastening member.

9. The sliding door according to claim 1, wherein the light emitter or the reflector is formed in a planar plate shape that extends along the rear surface of the second inner wall portion.

* * * * *